US011571682B2

(12) United States Patent
Bauer et al.

(10) Patent No.: US 11,571,682 B2
(45) Date of Patent: Feb. 7, 2023

(54) SELECTIVE CATALYTIC REDUCTION CATALYST COMPOSITION

(71) Applicant: JOHNSON MATTHEY CATALYSTS (GERMANY) GMBH, Redwitz an der Rodach (DE)

(72) Inventors: Jürgen Bauer, Redwitz an der Rodach (DE); Ralf Dotzel, Redwitz an der Rodach (DE); Jörg Werner Muench, Redwitz an der Rodach (DE); Ralitsa Purova, Erlangen (DE); Wilhelm Schwieger, Erlangen (DE); Thangaraj Selvam, Erlangen (DE); Ameen Shahid, Erlangen (DE)

( * ) Notice: Subject to any disclaimer, the term of this patent is extended or adjusted under 35 U.S.C. 154(b) by 0 days.

(21) Appl. No.: 16/947,620

(22) Filed: Aug. 10, 2020

(65) Prior Publication Data

US 2021/0008524 A1 Jan. 14, 2021

Related U.S. Application Data

(63) Continuation of application No. 15/937,942, filed on Mar. 28, 2018, now abandoned.

(30) Foreign Application Priority Data

Mar. 31, 2017 (GB) ..................................... 1705241

(51) Int. Cl.
| | |
|---|---|
| *B01J 21/16* | (2006.01) |
| *B01J 23/30* | (2006.01) |
| *B01J 37/02* | (2006.01) |
| *B01D 53/94* | (2006.01) |
| *F01N 3/20* | (2006.01) |
| *B01J 23/72* | (2006.01) |
| *B01J 29/76* | (2006.01) |
| *B01J 29/04* | (2006.01) |
| *B01J 37/34* | (2006.01) |
| *F01N 13/16* | (2010.01) |
| *B01J 37/00* | (2006.01) |
| *B01J 21/18* | (2006.01) |
| *B01D 53/86* | (2006.01) |
| *F01N 3/28* | (2006.01) |
| *B01J 35/04* | (2006.01) |
| *B01J 37/04* | (2006.01) |
| *B01J 37/08* | (2006.01) |

(52) U.S. Cl.
CPC .......... *B01J 23/30* (2013.01); *B01D 53/8628* (2013.01); *B01D 53/9418* (2013.01); *B01J 21/16* (2013.01); *B01J 21/18* (2013.01); *B01J 23/72* (2013.01); *B01J 29/04* (2013.01); *B01J 29/049* (2013.01); *B01J 29/763* (2013.01); *B01J 35/04* (2013.01); *B01J 37/00* (2013.01); *B01J 37/0009* (2013.01); *B01J 37/0207* (2013.01); *B01J 37/04* (2013.01); *B01J 37/08* (2013.01); *B01J 37/343* (2013.01); *F01N 3/2066* (2013.01); *F01N 3/2825* (2013.01); *F01N 13/16* (2013.01); *B01D 2255/2096* (2013.01); *B01D 2255/20707* (2013.01); *B01D 2255/20723* (2013.01); *B01D 2255/20738* (2013.01); *B01D 2255/20769* (2013.01); *B01D 2255/20776* (2013.01); *B01D 2255/30* (2013.01); *B01D 2255/40* (2013.01); *B01D 2255/50* (2013.01); *B01D 2255/9025* (2013.01); *F01N 2610/02* (2013.01)

(58) Field of Classification Search
None
See application file for complete search history.

(56) References Cited

U.S. PATENT DOCUMENTS

| | | | |
|---|---|---|---|
| 4,085,193 | A | 4/1978 | Nakajima |
| 4,207,250 | A | 6/1980 | Butter et al. |
| 4,629,712 | A | 12/1986 | Pinnavaia et al. |
| 4,916,095 | A | 4/1990 | Fogler |
| 4,961,917 | A | 10/1990 | Byrne |

(Continued)

FOREIGN PATENT DOCUMENTS

| | | |
|---|---|---|
| CA | 2033965 | 1/1991 |
| CN | 102574115 A | 7/2012 |

(Continued)

OTHER PUBLICATIONS

Onal, Muserref, et al. "The Effect of Acid Activation on Some Physicochemical . . . ". Turk J. Chem. 26. 409-416. (2002). (Year: 2002).*
Alemdaroglu, Tulay, et al. "Investigation of the Surface Acidity of a Bentonite . . . ". Turk J Chem. 27. 675-681 (2003). (Year: 2003).*
Garcia-Lodeiro, I et al. "Use of clays in alkaline hybrid cement preparation . . . ". Materials Letters. 233. (134-137 2018). (Year: 2018).*
Yuan, Peng, et al. "A combined study by XRD, FTIR, TG . . . ". Journal of Colloid and Interface Science. 324. 142-149 (2008). (Year: 2008).*

(Continued)

*Primary Examiner* — Sheng H Davis

(57) ABSTRACT

A SCR catalyst composition comprises a SCR catalyst; and a binder comprising a porous inorganic material, wherein the porous inorganic material comprises a disordered arrangement of delaminated layers, has a disordered porous structure, and has a multimodal pore size distribution comprising at least a first modal maximum having a macroporous or mesoporous pore size and a second modal maximum having a microporous pore size. The SCR catalyst composition can be manufactured using the method comprising the steps of: (i) providing an inorganic material having a layered structure; (ii) contacting the material with a cationic surfactant to form a swollen material; (iii) agitating the swollen material to form an agitated material; and (iv) calcining the agitated material to recover a delaminated inorganic material, wherein an SCR catalyst is mixed with the inorganic material prior to step (iv).

15 Claims, 3 Drawing Sheets

(56) References Cited

U.S. PATENT DOCUMENTS

| | | | |
|---|---|---|---|
| 5,137,861 A | 8/1992 | Shih | |
| 5,310,714 A * | 5/1994 | Grasselli | B01D 53/02 423/330.1 |
| 5,415,850 A * | 5/1995 | Yang | B01D 53/8628 423/239.1 |
| 5,726,113 A | 3/1998 | Pinnavaia et al. | |
| 6,475,944 B1 | 11/2002 | Yang et al. | |
| 6,521,559 B1 | 2/2003 | Long et al. | |
| 7,476,639 B2 | 1/2009 | Koch | |
| 9,550,182 B2 | 1/2017 | Munch et al. | |
| 2004/0062909 A1 | 4/2004 | Tsapatsis | |
| 2004/0138051 A1 | 7/2004 | Shan | |
| 2005/0020861 A1 | 1/2005 | Baucherel et al. | |
| 2005/0133054 A1 | 6/2005 | Fournier | |
| 2006/0094594 A1 | 5/2006 | Koch et al. | |
| 2009/0214397 A1 * | 8/2009 | Shirono | B01J 23/8913 422/177 |
| 2011/0115136 A1 * | 5/2011 | Kunieda | C04B 35/80 264/631 |
| 2011/0118107 A1 | 5/2011 | Garcia-Martinez et al. | |
| 2012/0114887 A1 | 5/2012 | Drbohlav et al. | |
| 2012/0148487 A1 | 6/2012 | Katz | |
| 2012/0208692 A1 | 8/2012 | Munch et al. | |
| 2014/0296059 A1 * | 10/2014 | Suenobu | B01J 23/22 502/60 |
| 2014/0328738 A1 | 11/2014 | Chandler et al. | |
| 2015/0246346 A1 * | 9/2015 | Chandler | B01J 29/76 423/700 |
| 2017/0051233 A1 * | 2/2017 | Coope-Epstein | C11D 1/83 |

FOREIGN PATENT DOCUMENTS

| | | |
|---|---|---|
| CN | 104888756 A | 9/2015 |
| EP | 159096 A2 | 10/1985 |
| EP | 172619 A1 | 2/1986 |
| EP | 1590296 A1 | 11/2005 |
| EP | 1727619 A1 | 12/2006 |
| EP | 2522425 A1 | 11/2012 |
| WO | 9609890 A1 | 4/1996 |
| WO | 9939809 A1 | 8/1999 |
| WO | 0142320 A1 | 6/2001 |
| WO | 2004000546 A1 | 12/2003 |
| WO | 2004069746 A1 | 8/2004 |
| WO | 2008106519 A1 | 9/2008 |
| WO | 2010094021 A2 | 8/2010 |
| WO | 2010133565 A1 | 11/2010 |
| WO | 2014027207 A1 | 2/2014 |

OTHER PUBLICATIONS

Onal, Museffef, et al. "The Effect of Acid Activation on Some Physicochemical Properties of a Bentonite". Turk J. Chem. 26. 409-416. 2002. (Year: 2002).*

Krol-Morkisz, et al. "thermal Decomposition of Polymer Nanocomposites . . . ". Polymer Composites with Functionalized Nanoparticles. Elsevier. 2019. (Year: 2019).*

Boxiong et al; "Alkali metal deactivation of Mn-CeOx/Zr-delaminated-clay for the low-temperature selective catalytic reduction of NOx with NH3", Microporous and Mesoporous Materials, 180 (2013) pp. 262-269.

Natkanski et al, "Hydrogel template-assisted synthesis of nanometric Fe2O3 supported on exfoliated clay", Microporous and Mesoporous Materials 221 (2016) pp. 212-219.

Zang et al; "Resistance to SO2 poisioning of V2O5/TiO2-PILC catalysts for the selective reduction of NO by NH3," Chinese Journal of Catalysis, vol. 37, Jun. 5, 2016, pp. 888-897.

Li et al; "Selective catalytic reduction of nitric oxide by ethylene in the presence of oxygen over Cu2+ion-exchanged pillared clays," Applied Catalysis B Environmental 11 (1997) pp. 347-363.

Annabi-Bergaya, "Layered Clay Minerals, Basic Research and Innovative Composite Applications", Microporous and Mesoporous Materials 107, 2008, pp. 141-148.

* cited by examiner

SELECTIVE CATALYTIC REDUCTION CATALYST COMPOSITION

CROSS REFERENCE TO RELATED APPLICATIONS

This application is a continuation of U.S. application Ser. No. 15/937,942, filed Mar. 28, 2018, the entire contents of which are incorporated herein by reference.

The present invention relates to a selective catalytic reduction (SCR) catalyst composition. In particular, the present invention relates to a SCR catalyst composition having improved catalytic activity.

Catalyst compositions typically comprise, inter alia, particles of catalytic material held together with a binder. Conventional binders may comprise, for example, a clay material. The binder "binds" the catalyst composition together, and may serve to hold the catalyst composition in a desired shape and/or provide the catalyst composition with particular desired rheological characteristics. As will be appreciated, the binder will affect the overall characteristics of the catalyst composition. For example, the porosity characteristics of the binder may affect the access of gaseous species to catalytic sites within the catalyst composition. One problem with conventional binders, such as conventional clays, is that they exhibit limited, typically zero, catalytic activity. Accordingly, when high levels of binder are required, the catalyst composition may exhibit low catalytic activity per unit volume, thereby requiring larger volumes of catalyst composition to provide a desired catalytic effect or higher quantities of expensive catalytically active components.

Hydrocarbon combustion in diesel engines, stationary gas turbines, and other systems generates exhaust gas that must be treated to remove nitrogen oxides ($NO_x$), which comprises NO (nitric oxide), $NO_2$ (nitrogen dioxide) and $N_2O$ (nitrous oxide), with NO being the majority of the $NO_x$ formed. $NO_x$ is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. Preferably, $NO_x$ needs to be reduced selectively with a catalyst and a reductant in a process known as selective catalytic reduction (SCR) that converts $NO_x$ into elemental nitrogen ($N_2$) and water. In an SCR process, a gaseous reductant, typically anhydrous ammonia, aqueous ammonia, or urea, is added to an exhaust gas stream prior to the exhaust gas contacting the SCR catalyst. The reductant can be absorbed onto the SCR catalyst and the $NO_x$ reduced as the gases pass through or over the catalysed substrate.

Suitable catalysts for SCR known in the art include, for example, $V_2O_5/WO_3$ supported on $TiO_2$ (see WO 99/39809) and transition metal exchanged zeolites (see U.S. Pat. No. 4,961,917 and WO 2008/106519) or a mixture of the two (see WO 2014/027207). Active layered silicates, often referred to as "pillared interlayered clays" (PILCs), have been investigated for use as SCR catalysts (see, for example, EP 1727619, U.S. Pat. Nos. 6,521,559 and 5,415,850). PILCs are two-dimensional zeolite-like materials with artificially configured layers that are separated at controlled distances. PILCs are prepared by exchanging the charge-compensating cations between clay layers with large inorganic hydroxycations, which are polymeric or oligomeric hydroxy metal cations formed by hydrolysis of metal oxides or salts. Upon heating, the metal hydroxycations undergo dehydration and dehydroxylation, forming stable clusters of metal oxides, or other metal salts, which act as pillars keeping the thin silicate layers separated. This may create interlayer space of molecular dimensions. Oxides of metals such as, for example, titanium, zirconium, aluminium, iron and chromium have been used as "pillars". Due to their large pores and hydrothermal stability, PILCs are considered to be potential replacements for zeolite SCR catalysts. However, in comparison to conventional SCR catalysts, such as zeolites, the SCR catalytic activity of PILCs is low.

Natkanski et al, Microporous and Mesoporous Materials 221 (2016) 212-219 describes methods for the manufacture of a PILC. The methods are inefficient on an industrial scale, and also rely on the use of the mineral laponite, which has only limited availability.

U.S. Pat. No. 5,415,850 discloses certain pillared interlayered clay (PILC) catalysts, specifically $Cr_2O_3$-PILC, $Fe_2O_3$-PILC, $TiO_2$-PILC, $ZrO_2$-PILC and $Al_2O_3$-PILC, for use in the selective reduction (SCR) of nitrogen oxides (NOx) in exhaust gases in the presence of ammonia. The catalysts are said to have a bimodal pore structure for increased poison resistance and increased reaction rates.

U.S. Pat. No. 6,475,944 discloses a $V_2O_5$/Ti-PILC catalyst for removing NOx by using $NH_3$ as a reducing agent in the flue gas from an electric power plant and the like.

Accordingly, it is desirable to provide a SCR catalyst composition exhibiting improved catalytic activity and which may be manufactured more easily and/or to tackle at least some of the problems associated with the prior art or, at least, to provide a commercially useful alternative thereto.

According to a first aspect, there is provided a selective catalytic reduction (SCR) catalyst composition comprising:
  a SCR catalyst; and
  a binder comprising a porous inorganic material,
  wherein the porous inorganic material comprises a disordered arrangement of delaminated layers, has a disordered porous structure, and has a multimodal pore size distribution comprising at least a first modal maximum having a macroporous or mesoporous pore size and a second modal maximum having a microporous pore size.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

Furthermore, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

In comparison to SCR catalyst compositions containing conventional binders, it has been surprisingly found that the SCR catalyst composition of the present invention may exhibit improved SCR catalytic activity. Without being bound by theory, it is considered that the improved catalytic activity is a result of improved access to catalytic sites within the SCR catalyst composition due to the porosity characteristics of the inorganic material. Furthermore, the binder itself may exhibit SCR catalytic activity. For example, the binder may exhibit increased catalytic activity in comparison to a PILC. This may advantageously allow the use of lower levels of SCR catalyst in comparison to conventional SCR catalyst compositions to provide the same level of catalytic activity.

In comparison to a PILC, the porous inorganic material may have improved ability as a binder.

The SCR catalyst composition comprises a SCR catalyst and a binder. The SCR catalyst composition may comprise, for example, from 1 to 99 wt. % SCR catalyst and from 1 to 99 wt. % binder based on the total amount of the SCR catalyst and binder, or from 10 to 90 wt. % SCR catalyst and from 10 to 90 wt. % binder, or from 60 to 80 wt. % SCR catalyst and from 20 to 40 wt. % binder. As will be appreciated, the relative amounts of SCR catalyst and binder will depend on the desired catalytic activity and rheology of the SCR catalyst composition.

The SCR catalyst composition is typically in the form of a blend of the SCR catalyst and binder.

The SCR catalyst composition may be in the form of, for example, a washcoat. The washcoat may comprise, for example, one or more fillers, and/or one or more processing aids, and/or water, and/or one or more dopants.

Any suitable SCR catalyst may be employed. Suitable SCR catalysts are known in the art.

The SCR catalyst and/or porous inorganic material may be in the form of, for example, particles, e.g. a powder. The particles (e.g. at least 95% of the particles) may have a longest dimension of, for example, from 1 to 20 μm. These longest dimensions refer to the individual particles themselves rather than, for example, agglomerates of particles. The longest dimension may be measured, for example, using scanning electron microscopy (SEM). When the particles are in the shape of a sphere, the longest dimension is the diameter of the sphere.

The binder may function to hold the SCR catalyst composition in a desired shape and/or to provide the SCR catalyst composition with a desired rheology. The binder may advantageously render the SCR catalyst composition extrudable. This may enable the SCR catalyst composition to be more easily processed into a desired shape, for example a honeycomb shape.

The porous inorganic material comprises a disordered arrangement of delaminated layers, for example delaminated silicate layers. This is in contrast to a PILC. In the porous inorganic material, typically substantially all layers are delaminated. In other words, typically the porous inorganic material does not contain any stacked layers. The substantial absence of any stacked layers may be observed, for example, via the use of powder X-ray diffraction. The disordered arrangement of delaminated layers contains substantially no long-range ordering of the layers. The substantial absence of any long-range ordering of the layers may be observed, for example, via the use of powder X-ray diffraction.

The porous inorganic material has a disordered pore structure. This is in contrast to, for example, a zeolite or a PILC, in which the pores are arranged in a repeating pattern. The disordered pore structure means that the pores substantially do not exhibit any long-range order. The substantial absence of any long-range order may be observed, for example, via powder X-ray diffraction.

The pore size distribution of the porous inorganic material is determined using, for example, a nitrogen sorption technique or mercury intrusion porosimetry (MIP). Such a technique is well known in the art. The pore size distribution may have a number of peaks, i.e. be multimodal, but at least has two peaks and preferably is essentially a bimodal distribution, i.e. at least 80% (preferably 90%) by volume of the pores are associated with the two peaks. Preferably substantially all of the pores are associated with the two peaks. It is preferred that the first and second peaks are relatively clearly defined, that is, the standard deviation from the modal values (the highest points in each peak) is relatively low. In relation to the pore size distribution, in accordance with the IUPAC definition, the term "macroporous" means that the pore diameter is greater than 50, the term "mesoporous" means that the pore diameter is from 2 to 50 nm, and the term "microporous" means that the pore diameter is less than 2 nm.

The porous inorganic material contains both macropores, mesopores and micropores. The macropores, mesopores may be formed between disordered delaminated layers, and the micropores may be provided in the disordered delaminated layers themselves. Such a structure is sometimes referred to as a "house of cards" structure.

In a preferred embodiment, the multimodal pore size distribution is bimodal. Substantially restricting the pores of the porous inorganic material to being either: (i) macroporous, mesoporous, or (ii) microporous may provide the SCR catalyst composition with a high level of access to catalytic sites and a high catalytic activity.

Preferably, the porous inorganic material is substantially X-ray amorphous. By "X-ray amorphous" it is meant that a powder X-ray diffraction pattern of the porous inorganic material obtained using Cu Kα radiation is devoid of peaks at 2θ values of less than less than 20°, typically less than 15° and preferably less than 10° (e.g. from 2 to 10°). The powder X-ray diffraction pattern being "devoid" of such peaks means that either such peaks cannot be observed in the powder X-ray diffraction pattern, or that the intensity of such peaks is less than 5% that of the most intense peak of the powder X-ray diffraction pattern attributable to the porous inorganic material, typically less than 1%. Without being bound by theory, it is considered that such 2θ values may correspond to a large d-spacing associated with a large unit cell derived from ordering of layers. The powder X-ray diffraction pattern may, of course, contain peaks at 2θ values of 10° or higher, which may be associated with, for example, order within the delaminated layers themselves. In addition, a powder X-ray diffraction pattern of the porous inorganic material may contain peaks corresponding to impurities in the starting material. For example, when the starting material is bentonite, the powder X-ray diffraction pattern may contain peaks corresponding to impurities such as, for example, quartz or cristobalite. When considering whether the powder X-ray diffraction pattern of the porous inorganic material is "devoid" of the peaks referred to above, it will be appreciated that peaks corresponding to impurity phases are not counted.

The first modal maximum preferably has a macroporous and/or mesoporous pore size. The presence of a high number of macropores may increase the access of species to be treated (e.g. gaseous species in an exhaust gas) to catalytic sites within the SCR catalyst composition. A PILC cannot contain macropores and cannot have a macroporous modal maximum.

The delaminated layers are preferably delaminated silicate layers. Delaminated silicate layers are particularly suitable for providing the above-mentioned pore size distribution.

The porous inorganic material preferably comprises one or more of: a clay mineral, graphite, graphene, a layered silicate, a layered phosphate, a layered zeolite, a layered double hydroxide, (e.g. hydrotalcite), a layered perovskite, attapulgite, sepiolite and vermiculite. Such species may be particularly suitable for providing the above-mentioned pore size distribution and may be particularly suitable for use as a binder.

The porous inorganic material preferably comprises a clay mineral, more preferably a three-layered (2:1) clay mineral. In a preferred embodiment, the clay mineral comprises bentonite. Such materials may be particularly suitable for providing the above-mentioned pore size distribution and may be particularly suitable for use as a binder.

Preferably, the porous inorganic material is substantially non-pillared. By "non-pillared" it is meant that the delaminated layers are not separated by intercalated polymer chains or keggin ions, for example via in situ polymerisation of monomers between the layers (see, for example, Natkanski et al, Microporous and Mesoporous Materials, 221 (2016) 212-219). The long-range order provided by such pillars may be observed, for example, using powder X-ray diffraction. In contrast to PILCs, the substantially non-pillared porous inorganic material of the present invention may be prepared more easily and at lower cost, since an in situ polymerisation step is not required. Furthermore, the catalytic activity, in particular SCR catalytic activity, may be increased in comparison to PILCs. In addition, in comparison to PILCs, the binding ability of the porous inorganic material may be improved. Compared with a PILC, the porous inorganic material may have a lower surface area and/or meso-/macro-porosity (a typical surface area of ~500 $m^2/g$ vs ~150-200 $m^2/g$). The porous inorganic material may have a larger surface area and/or meso-/macro-porosity in comparison to its corresponding parent clay (typically ~80-100 $m^2/g$).

The porous inorganic material is preferably functionalised with one or more of Cu, Fe, Ce, Mn, V, Zn, Mo, Pt, Pd, Rh, Ir and Ni. By "functionalised" it is meant that one or more of these elements have been incorporated into the porous inorganic material, for example via ion exchange, impregnation or isomorphous substitution. Functionalising the porous inorganic material with such elements may serve to increase the catalytic activity of the porous inorganic material.

In a preferred embodiment, the porous inorganic material is functionalised with Cu and/or Fe. Such elements may serve to increase the SCR catalytic activity of the porous inorganic material. In this embodiment, the SCR catalyst preferably comprises a zeolite, for example chabazite. The combination of a zeolite SCR catalyst and a porous inorganic material functionalised with Cu and/or Fe may result in the SCR catalyst composition exhibiting particularly pronounced SCR catalytic activity.

The zeolite may be a small pore zeolite (a zeolite containing a maximum ring size of 8 tetrahedral atoms) such as chabazite (CHA). The zeolite may be a medium pore zeolite (a zeolite containing a maximum ring size of 10 tetrahedral atoms) such as ZSM-5 (MFI). The zeolite may be a large pore zeolite (a zeolite having a maximum ring size of 12 tetrahedral atoms), such as Beta (BEA). Small pore zeolites are preferred. The term "zeolite" as used herein is intended to refer generally to a molecular sieve rather than, for example, just an aluminosilicate molecular sieve. In other words, the term "zeolite" may cover materials other than aluminosilicates, such as, for example, SAPOs and AlPOs. The zeolite (molecular sieve) is preferably selected from the Framework Type Codes AEI, AFX, CHA, ERI, FER, BEA, MFI, STT and LEV. AEI is particularly preferred. Such zeolites may provide the composite material with high levels of SCR catalytic activity. The zeolite is preferably an aluminosilicate zeolite. Aluminosilicate zeolites are capable of undergoing favourable levels of copper and iron exchange at the alumina sites. Accordingly, following exchange such zeolites may provide the composite material with high levels of SCR catalytic activity. The term "aluminosilicate" as used herein may encompass zeolite structures containing only alumina and silica. In addition, the term "aluminosilicate" as used herein may encompass zeolite structures containing species other than alumina and silica, for example metals (e.g. iron).

In an alternative embodiment, the SCR catalyst comprises a titania and the porous inorganic material is functionalised with V and/or Fe. Such a combination may result in the SCR catalyst composition exhibiting particularly pronounced SCR catalytic activity. In this embodiment, preferably the titania comprises W, Si and/or Mo and the porous inorganic material is functionalised with V. This may serve to further improve the SCR catalytic activity of the SCR catalyst composition.

In a preferred embodiment, the SCR catalyst composition comprises a blend of both a titania functionalised with V and/or Fe; and a zeolite (molecular sieve)—preferably an aluminosilicate zeolite—functionalised with copper and/or iron as described in WO 2014/027207 A1.

The titania functionalised with V and/or Fe preferably further comprises tungsten oxide. The iron is preferably present as iron vanadate.

The SCR catalyst composition preferably comprises about 0.5 to about 5 wt. % of the vanadium calculated as $V_2O_5$ based on the total weight of the first component and the second component.

The porous inorganic material preferably comprises from 0.01 to 5 wt. % Fe, more preferably from 1 to 4 wt. % Fe. Such an Fe level may provide the porous inorganic material with particularly high SCR catalytic activity.

The SCR catalyst composition is preferably extrudable. This may allow the SCR catalyst composition to be formed more easily into a desired shape during manufacture.

The SCR catalyst composition is preferably in the form of pellets or a plate or has a honeycomb structure. Such shapes may be advantageous when the SCR catalyst composition is incorporated into a SCR catalyst article.

In a second aspect, there is provided an emission treatment system for treating a flow of a combustion exhaust gas, the system comprising a source of combustion exhaust gas in fluid communication with the SCR catalyst composition described herein, and a source of nitrogenous reductant arranged upstream of said SCR catalyst composition. Such an emission treatment may be, for example, a vehicle emission treatment system, e.g. an automotive vehicle diesel engine emission treatment system. The nitrogenous reductant may comprise, for example, ammonia and/or urea.

The preferable features of the first aspect apply equally to this second aspect.

In a third aspect, there is provided a method for the manufacture of a SCR catalyst composition, the method comprising:
(i) providing an inorganic material having a layered structure;

(ii) contacting the material with a cationic surfactant to form a swollen material;
(iii) agitating the swollen material to form an agitated material; and
(iv) calcining the agitated material to recover a delaminated inorganic material, wherein an SCR catalyst is mixed with the inorganic material prior to step (iv).

The SCR catalyst composition may be the SCR catalyst composition of the first aspect of the invention. The preferable features of the first aspect of the invention apply equally to this third aspect.

The method is less complex in comparison to methods of manufacturing a PILC.

The inorganic material having a layered structure may comprise the inorganic materials referred to above in relation to the first aspect, for example, a clay mineral, graphite, graphene, a layered silicate, a layered phosphate, a layered zeolite, a layered double hydroxide, hydrotalcite, a layered perovskite, attapulgite, sepiolite and vermiculite. The inorganic material is preferably microporous/mesoporous and can contain macropores (see Examples). This may serve to provide a meso- and/or macroporous modal maximum in the pore size distribution of the final SCR catalyst composition. This is advantageous because the porosity of the inorganic material can assist with gas mass transfer within the SCR catalyst composition as a whole.

Contacting the material with a cationic surfactant to form a swollen material is typically carried out in a liquid, for example an aqueous liquid. The material and cationic surfactant may be added to the liquid at the same time, or may be added sequentially. Contacting the material with a cationic surfactant may result in a mixture of the material and cationic surfactant. By "swollen material" it is meant that the interlayer spacing of the layers of the inorganic material is increased, typically as a result of the cationic surfactant intercalating between the layers.

The SCR catalyst is mixed with the inorganic material prior to step (iv), i.e. prior to step (ii), and/or with the swollen material after step (ii) but prior to step (iii), and/or with the swollen material during step (iii), and/or with the agitated material after step (iii) but prior to step (iv). Such a "one pot" manufacturing method, in which the SCR catalyst is mixed with the inorganic material prior to calcination, may be simpler in comparison to conventional SCR catalyst composition manufacturing methods.

The cationic surfactant preferably comprises a carbon chain having at least 10 carbon atoms, more preferably from 12 to 20 carbon atoms. Such surfactants may be particularly suitable for increasing the interlayer spacing of the inorganic material.

Step (ii) preferably comprises mixing the material and an aqueous solution of the cationic surfactant to form a mixture, followed by storing the mixture for a period of from 1 to 3 days, more preferably wherein the storing is carried out at a temperature of from 30 to 50° C.

Agitating the swollen material may be carried out, for example, by the use of shear mixing and/or sonication and/or the use of microwaves. The agitating preferably comprises sonication and/or the application of microwaves. In a preferred embodiment, the sonication comprises ultrasonication. Such forms of agitation may be particularly suitable for causing delamination of the inorganic material. Ultrasonication is particularly preferred since, in contrast to chemical delamination methods (e.g. involving a pH change or a concentration change), the delamination tends to be irreversible.

Step (iii) is preferably carried out for a period of from 1 to 4 hours, and/or at a temperature of from 15 to 35° C. Such conditions may be particularly suitable for causing delamination of the inorganic material.

The method preferably further comprises contacting the agitated material and/or delaminated inorganic material with a solution of metal ions to incorporate at least some of the metal ions into the agitated material and/or delaminated inorganic material, the metal selected from one or more of Cu, Fe, Ce, Mn, V, Zn, Mo, Pt, Pd, Rh, Ir and Ni. Such "ion exchange" techniques are known in the art. When the inorganic material is an aluminosilicate, the metal ions will typically ion exchange at the alumina site.

The method preferably comprises forming the material into a desired shape, wherein the forming preferably comprises extrusion and the desired shape preferably comprises pellets or a sheet or a honeycomb structure.

The SCR catalyst composition may be the SCR catalyst composition according to the first aspect.

In a fourth aspect, there is provided a method for the manufacture of a porous inorganic material, the method comprising:
(i) providing an inorganic material having a layered structure;
(ii) contacting the material with a cationic surfactant to form a swollen material;
(iii) agitating the swollen material to form an agitated material; and
(iv) calcining the agitated material to recover a delaminated inorganic material.

The porous inorganic material may be the porous inorganic material of the SCR catalyst composition according to the first aspect of the invention. The preferable features of the first, second and third aspects described hereinabove apply equally to this fourth aspect.

In a fifth aspect, there is provided a porous inorganic material comprising a disordered arrangement of delaminated silicate layers, a disordered porous structure, a pore size distribution comprising at least a first modal maximum having a macroporous or mesoporous pore size and a second modal maximum having a microporous pore size, the porous inorganic material obtainable by the method of the previous aspect.

In a sixth aspect, there is provided use of the porous inorganic material as described herein in a SCR catalyst composition. In an alternative embodiment, the SCR catalyst composition is an ammonia slip catalyst composition, and the SCR catalyst is preferably a zeolite functionalised with platinum group metal.

In a seventh aspect, there is provided use of the porous inorganic material as described herein to increase the catalytic activity of an SCR catalyst composition.

The present disclosure will now be described in relation to the following non-limiting figures, in which.

Figure 3:
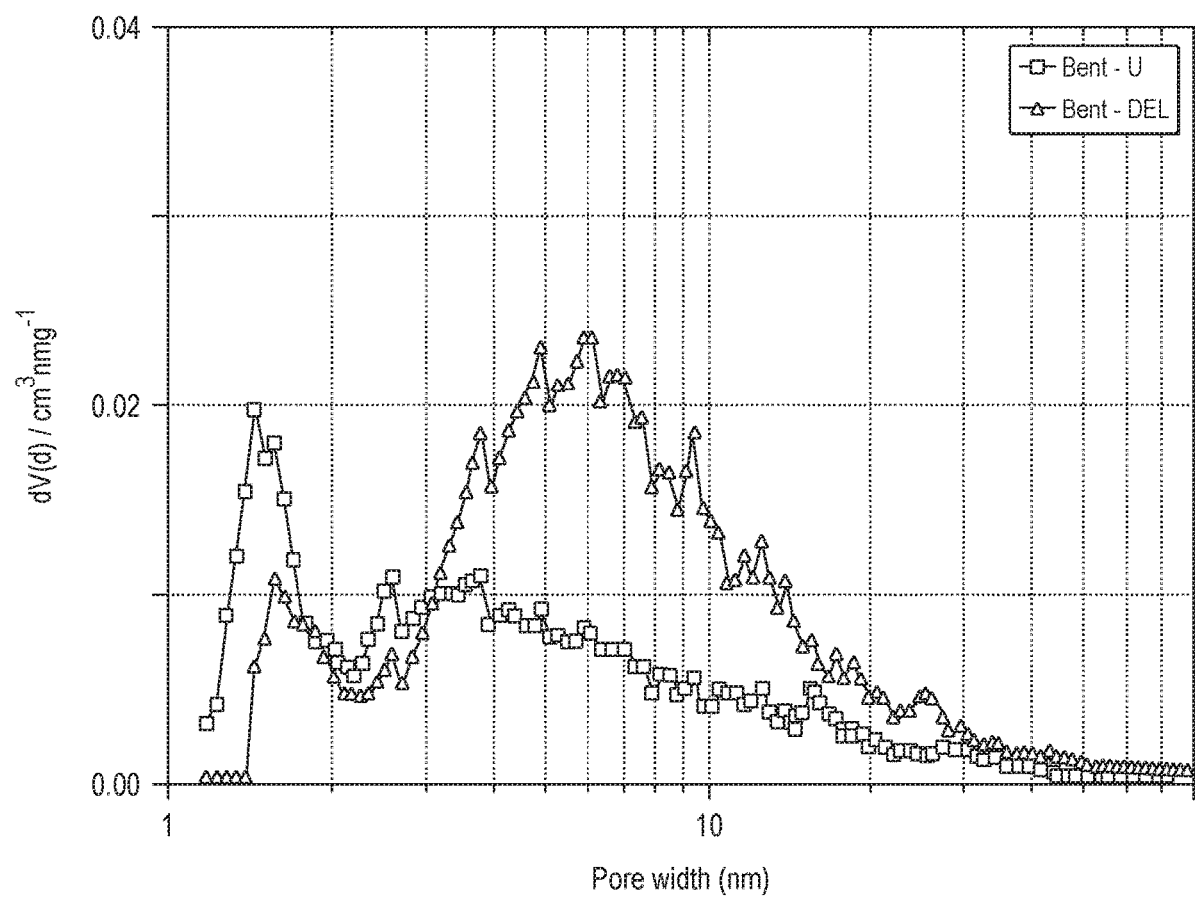
FIG. 3 shows a $N_2$ sorption pore size distribution of Bentonite-U and Bentonite-DEL according to Example 1.

Referring to FIG. 3, there is shown a method for the manufacture of a SCR catalyst composition, the method comprising: (i) providing an inorganic material having a layered structure; (ii) contacting the material with a cationic surfactant to form a swollen material; (iii) agitating the swollen material to form an agitated material; and (iv) calcining the agitated material to recover a delaminated inorganic material, The present disclosure will now be described in relation to the following non-limiting examples.

EXAMPLE 1

A number of binders comprising a porous inorganic material were prepared. The starting material used was Bentonite-B (Witgert), which is composed of:

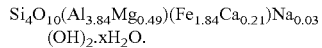

$Si_4O_{10}(Al_{3.84}Mg_{0.49})(Fe_{1.84}Ca_{0.21})Na_{0.03}(OH)_2 \cdot xH_2O$.

Step 1 (steps (i) and (ii) in the claimed method): In the first step, the small cations between the layers of the bentonite were exchanged using hexadecyltrimethylammonium bromide (CTAB). To this end, 30 g of CTAB and 13 g of tetrapropylammonium hydroxide (TPAOH, 40% solution) were dissolved in 116 ml of water under agitation (magnetic stirrer). Then, 5 g of bentonite were gradually admixed. The mixing took 20 minutes. The exchange was then carried out at 40° C. under continuous, gentle stirring for a period of 2 days.

Step 2 (steps (iii) and (iv) in the claimed method): In the second step, delamination of the layered structure was initiated by ultrasonication at room temperature. The treatment time was two hours. Thereafter, the solid fraction was separated from the dispersion by centrifugation and dried at 75° C. for 12 hours. This drying step was followed by a calcination at 550° C. in air for 5 hours. The heating rate for this was 1 K/min.

Figure 1:
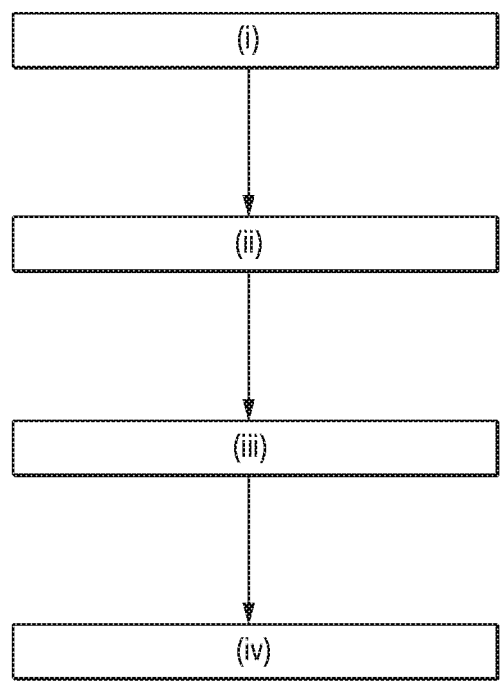
FIG. 1 shows a flow chart of a method according to the present invention.
Figure 2:
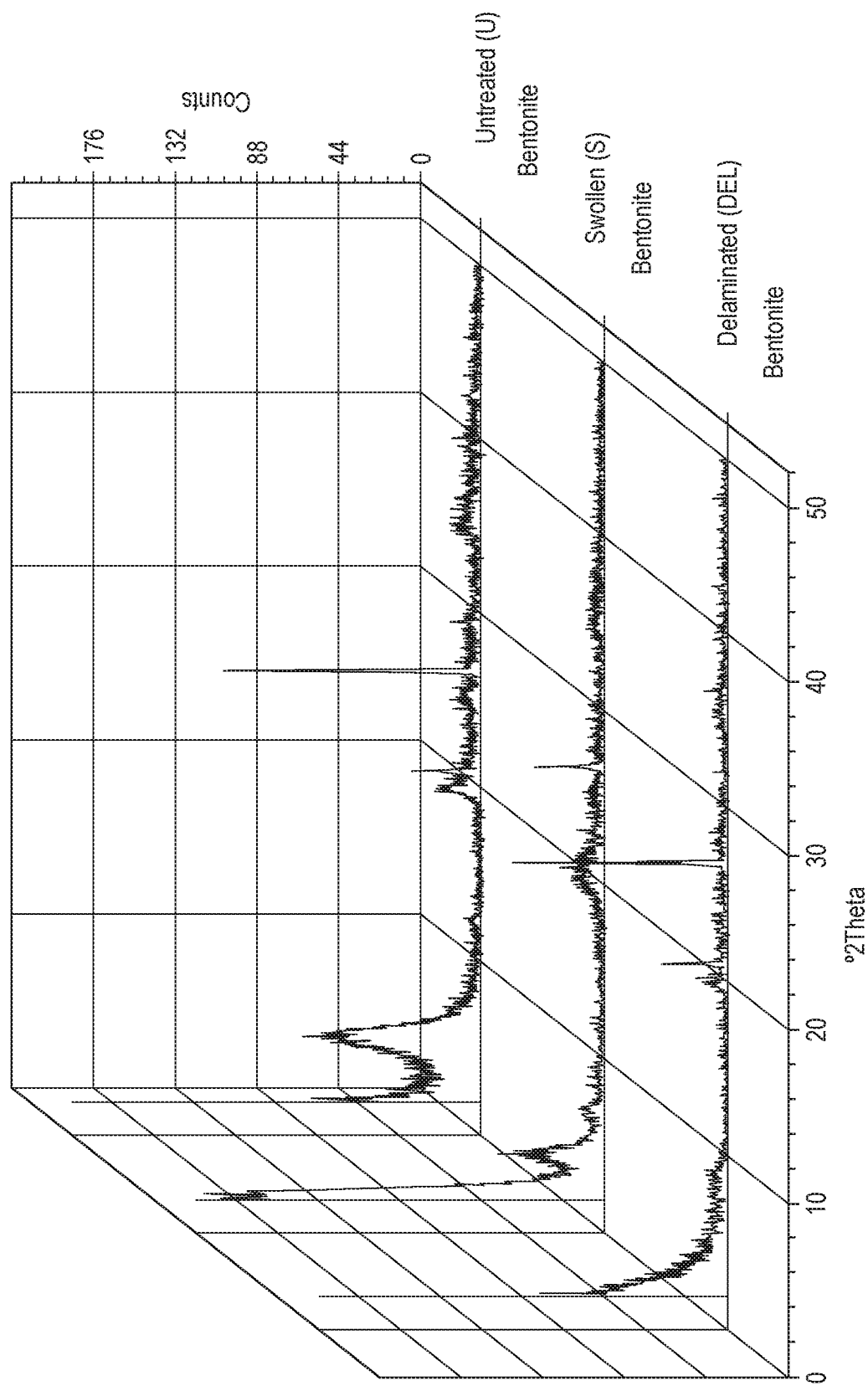
FIG. 2 shows powder X-ray diffraction patterns of Bentonite-U, Bentonite-S and Bentonite-DEL according to Example 1.

FIG. 2 shows powder X-ray diffraction patterns of the untreated bentonite material (Bentonite-U), the swollen bentonite after step 1 (Bentonite-S) and the delaminated clay after step 2 (Bentonite-DEL). It can be observed that a number of peaks decline in intensity after ultrasonication especially peaks from 2° to 10° 2Theta, indicating a disordered arrangement of delaminated layers. A powder X-ray diffraction pattern of the bentonite material after swelling was also measured, from which the change in layer spacing on swelling could be observed.

FIG. 3 shows pore size distributions obtained from nitrogen sorption measurements for the untreated bentonite (Bentonite-U) and the delaminated bentonite (Bentonite-DEL). Compared to the untreated clay two pronounced maxima, one maximum in the micropore range and one maximum in the mesopore range, have been observed for the delaminated clay. In Table 1 the derived specific surface area and pore volume data are summarized showing an increase in meso- and macropore volume and therefore a significantly higher total pore volume and specific surface area for the delaminated bentonite material.

TABLE 1

Porosity characteristics by $N_2$-sorption measurement

|  | BET ($m^2$/g) | Total pore volume ($cm^3$/g) | Micropore volume ($cm^3$/g) | Mesopore volume ($cm^3$/g) | Macropore volume ($cm^3$/g) |
|---|---|---|---|---|---|
| Bent-U | 107 | 0.174 | 0.041 | 0.110 | 0.023 |
| Bent-DEL | 165 | 0.342 | 0.025 | 0.283 | 0.034 |

EXAMPLE 2

The following SCR catalyst compositions were prepared:
1. 100 wt. % Cu-CHA zeolite (according to WO 2008/132452; comparative example);
2. 80 wt. % V-Ti-W/20 wt. % delaminated bentonite (present invention), 80 wt. % Cu-CHA+20 wt. % Bentonite-U (comparative example);
3. 80 wt. % Cu-CHA+20 wt. % Bentonite-DEL; and
4. 80 wt. % Cu-CHA+20 wt. % Fe-Bentonite-DEL., Composition 4 was prepared by functionalising Bentonite-DEL with 2 wt. % Fe (using $Fe(NO_3)_3$ as source of Fe) by wet ion exchange. The Fe-Bentonite-DEL material was then mixed with the Cu-CHA SCR catalyst.

The NOx conversion activity of powder samples of each of compositions 1-4 were tested in a laboratory synthetic catalytic activity test (SCAT) apparatus using a gas mixture of 500 ppm NO, 550 ppm $NH_3$, 8% $O_2$, 10% $H_2O$, rest $N_2$ and the results are shown in Table 2. No $N_2O$ was detected. The results indicate higher NOx conversion with delaminated bentonite than non-delaminated bentonite, even higher conversion with the sample containing the Fe-Bentonite-DEL material. Composition 4 has nearly the same activity level as composition 1 (100 wt. % Cu-CHA).

TABLE 2

NOx conversion for SCR catalyst composition 1-4
(500 ppm NO, 550 ppm $NH_3$, 8% $O_2$, 10% $H_2O$, rest $N_2$; volume flux = 1000 ml $min^{-1}$; sample mass = 0.05 g)

|  | NOx Conversion (%) | | | |
|---|---|---|---|---|
|  | 200° C. | 300° C. | 400° C. | 500° C. |
| 1. 100% Cu-CHA | 46 | 100 | 100 | 94 |
| 2. 80% Cu-CHA + 20% Bentonite-U | 26 | 74 | 91 | 92 |
| 3. 80% Cu-CHA + 20% Bentonite-DEL | 30 | 92 | 98 | 82 |
| 4. 80% Cu-CHA + 20% Fe-Bentonite-DEL | 45 | 100 | 100 | 91 |

EXAMPLE 3

The following four SCR catalyst compositions were prepared:
5. 100 wt. % V-Ti-W (according to U.S. Pat. No. 4,085,193; comparative example);
6. 70 wt. % V-Ti-W+30 wt. % Bentonite-U (comparative example); and
7. 70 wt. % V-Ti-W+30 wt. % Fe-Bentonite-DEL delaminated bentonite* functionalised with Fe

* As explained in Example 2, composition 3 was prepared by addition of 2 wt. % Fe to the delaminated clay prior mixing with V-Ti-W SCR catalyst.

NOx conversion testing of powder samples of compositions 5-7 was carried out using a SCAT apparatus (Reaction conditions: 500 ppm NO, 550 ppm $NH_3$, 8% $O_2$, 10% $H_2O$, rest $N_2$) and the results are shown in Table 3. No $N_2O$ was detected. Composition 7 shows higher NOx conversion compared to Composition 6 at high temperatures and nearly the same level of conversion at 500° C. compared to composition 5 (100% V-Ti-W SCR catalyst).

TABLE 3

NOx conversion for SCR catalyst composition 5-7
(500 ppm NO, 550 ppm NH$_3$, 8% O$_2$, 10% H$_2$O, rest N$_2$; volume
flux = 1000 ml min$^{-1}$; sample mass = 0.05 g).

| | NOx Conversion [%] | | | |
|---|---|---|---|---|
| | 200° C. | 300° C. | 400° C. | 500° C. |
| 5. 100% V-Ti-W | 7 | 49 | 79 | 70 |
| 6. 70% V-Ti-W + 30% Bentonite-U | 5 | 38 | 53 | 50 |
| 7. 70% V-Ti-W + 30% Fe-DEL-Bentonite | 5 | 37 | 60 | 65 |

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

For the avoidance of doubt, the entire contents of all documents acknowledged herein are incorporated herein by reference.

The invention claimed is:

1. A selective catalytic reduction (SCR) catalyst composition comprising:
    a SCR catalyst; and
    a binder comprising a porous inorganic material,
    wherein the porous inorganic material comprises a disordered arrangement of delaminated layers, has a disordered porous structure, and has a multimodal pore size distribution comprising at least a first modal maximum having a macroporous or mesoporous pore size and a second modal maximum having a microporous pore size, and
    wherein the porous inorganic material is substantially non-pillared.

2. The SCR catalyst composition of claim 1, wherein the multimodal pore size distribution is bimodal.

3. The SCR catalyst composition of claim 1, wherein a powder X-ray diffraction pattern of the porous inorganic material obtained using Cu Kα radiation is devoid of peaks at 2θ values of 10° or less.

4. The SCR catalyst composition of claim 1, wherein the first modal maximum has a mesoporous and/or macroporous pore size.

5. The SCR catalyst of claim 1, wherein the delaminated layers are delaminated silicate layers.

6. The SCR catalyst composition of claim 1, wherein the porous inorganic material comprises one or more of: a clay mineral, graphite, graphene, a layered silicate, a layered phosphate, a layered zeolite, a layered double hydroxide, hydrotalcite, a layered perovskite, attapulgite, sepiolite and vermiculite.

7. The SCR catalyst composition of claim 1, wherein the porous inorganic material is functionalised with one or more of Cu, Fe, Ce, Mn, V, Zn, Mo, Pt, Pd, Rh, Ir and Ni.

8. The SCR catalyst composition of claim 1, wherein the porous inorganic material is functionalised with Cu and/or Fe.

9. The SCR catalyst composition of claim 1, wherein the SCR catalyst comprises a zeolite.

10. The SCR catalyst composition of claim 1, wherein the SCR catalyst comprises a titania and the porous inorganic material is functionalised with V and/or Fe.

11. The SCR catalyst composition of claim 10, wherein the titania comprises W, Si and/or Mo and the porous inorganic material is functionalised with V.

12. The SCR catalyst composition of claim 1, wherein the porous inorganic material comprises from 0.01 to 5 wt. % Fe.

13. The SCR catalyst composition of claim 1, wherein the SCR catalyst composition is extrudable.

14. The SCR catalyst composition of claim 1 in the form of pellets or a sheet or having a honeycomb structure.

15. An emission treatment system for treating a flow of a combustion exhaust gas, the system comprising a source of combustion exhaust gas in fluid communication with the SCR catalyst composition of claim 1, and a source of nitrogenous reductant arranged upstream of said SCR catalyst composition.

* * * * *